United States Patent [19]
Kester

[11] Patent Number: 6,003,093
[45] Date of Patent: Dec. 14, 1999

[54] ARCHITECTURE FOR IMAGE PROCESSING APPLICATION

[75] Inventor: Kevin Scott Kester, San Jose, Calif.

[73] Assignee: Canon Kabushiki Kaisha, Tokyo, Japan

[21] Appl. No.: 08/769,536

[22] Filed: Dec. 19, 1996

[51] Int. Cl.[6] .................................................. G06F 13/10
[52] U.S. Cl. ........................................................... 709/301
[58] Field of Search ........................... 395/681; 709/301, 709/300, 302

[56] References Cited

U.S. PATENT DOCUMENTS

| | | | |
|---|---|---|---|
| 5,265,252 | 11/1993 | Rawson, III et al. | 395/701 |
| 5,319,751 | 6/1994 | Garney | 395/200 |
| 5,404,494 | 4/1995 | Garney | 395/500 |
| 5,613,123 | 3/1997 | Tsang et al. | 395/651 |
| 5,630,101 | 5/1997 | Sieffert | 395/500 |
| 5,706,457 | 1/1998 | Dwyer et al. | 395/349 |
| 5,745,762 | 4/1998 | Celi, Jr. et al. | 709/301 |
| 5,752,032 | 5/1998 | Keller et al. | 709/301 |
| 5,764,866 | 6/1998 | Maniwa | 395/114 |
| 5,911,044 | 6/1999 | Lo et al. | 395/200.33 |

OTHER PUBLICATIONS

Lindley, Craig. A., "Image Acquistion Using Twain," Dr. Dobb's Journal, p. (14), Sep. 1994.

Armand, Francois, "Give a Process to Your Drivers," pp. 1–18, Chorus Systems, Sep. 1991.

*Primary Examiner*—Alvin E. Oberley
*Assistant Examiner*—St. John Courtenay, III
*Attorney, Agent, or Firm*—Fitzpatrick, Cella, Harper & Scinto

[57] ABSTRACT

A TWAIN-compliant image processing application. The TWAIN-compliant image processing application includes a plurality of TWAIN stub data sources, each having a descriptor indicative of a particular image input device but otherwise being identical, each of said TWAIN stub data sources being callable by another image processing application requiring device driver functionality, a TWAIN protocol manager which receives commands in the form of TWAIN triplets, parses the TWAIN triplets, and executes the commands, and a driver manager for communicating with the TWAIN protocol manager and the particular image input device indicated by the descriptor of the TWAIN stub data source from which the TWAIN protocol manager receives the TWAIN triplets.

40 Claims, 7 Drawing Sheets

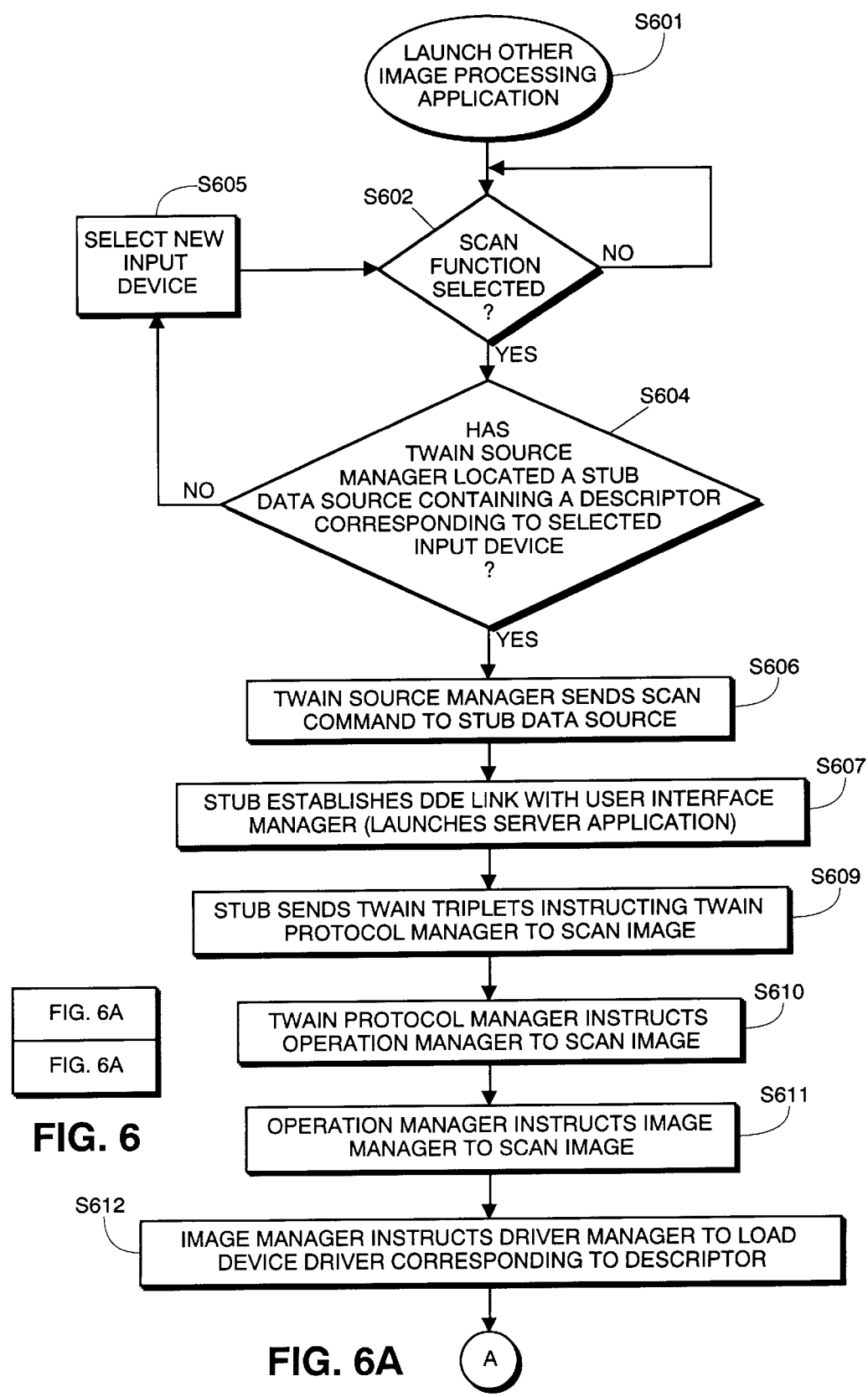

ARCHITECTURE FOR IMAGE PROCESSING APPLICATION

BACKGROUND OF THE INVENTION

1. Field Of The Invention

The present invention pertains to an improved architecture for image processing applications. Particularly, the architecture of the present invention provides both stand-alone operation of an image processing application as well as a TWAIN-compliant interface to another image processing application (via a Dynamic Data Exchange link); and also allows extensibility for operation within various platforms (such as Windows, OS/2 and Macintosh), for interface to a full line of image input devices (such as various models of commercially available scanners), and for utilization of plug-in modules which provide new or extended image transformation functionality.

2. Description Of The Related Art

"TWAIN" is the name of an application programming interface (API), jointly developed by Eastman Kodak, Logitech, Caere, Aldus and Hewlett-Packard, which provides an industry-wide imaging standard. TWAIN has gained widespread acceptance by press, analysts, and vendor communities, and continues to grow in popularity. It is therefore desirable for software image processing applications and for hardware image input devices both to be "TWAIN-compliant".

With respect to the software side, it is necessary to frequently update current versions of TWAIN-compliant image processing applications. Several factors contribute to this need. First, the TWAIN protocol is constantly evolving. For example, whereas TWAIN was originally developed as a protocol by which image data could be scanned in by a hardware scanner, it is now also relied on as a protocol for retrieving image data stored in computer files. Second, hardware devices are increasing in complexity and providing new functionality (such as marquee scanning by which only a portion of a scanner's platen is scanned in) not envisioned when TWAIN was originally developed. Accordingly, device drivers must be added to an image processing application in order to provide support for such hardware devices. Third, end-users are continually making demands for improved or new image transformation and processing techniques by which scanned images may be manipulated and transformed. And fourth, TWAIN-compliant drivers have recently been called upon to function both in a service mode and also in a stand-alone mode in which they provide an independent user interface and corresponding image processing capabilities. Of course, there are other factors which contribute to the need for frequent updating of TWAIN-compliant image processing applications.

Conventional TWAIN-compliant device drivers cannot easily be updated to address the foregoing circumstances. This conventional software was designed from "the ground up", meaning that it was designed as an insular unit of code written to specific design requirements and to specific hardware. Therefore, while such software meets those requirements, the software is not easily extensible to meet new requirements.

SUMMARY OF THE INVENTION

It is therefore an object of the invention to provide an architecture for a TWAIN-compliant image processing driver/application in which various functionality of the image processing application is apportioned among specific managers, each of which is responsible for managing a specific aspect of the image processing application, and in which TWAIN stub data sources are used to communicate with another TWAIN-compliant image processing application. Because the image processing application is partitioned into different managers, the application can readily be extended for operation within various operating systems, for interface to a full line of image input devices, and for utilization of plug-in modules which provide new or extended image transformation functionality. In addition, the TWAIN stub data sources allow code to be shared among TWAIN devices, thus reducing disk usage and enabling easier code updates.

According to the invention, the image processing application is partitioned into four main managers: a user interface manager, an operation manager, an image manager, and a driver manager. Other managers may also be provided, as desired, but the above four managers are required.

The user interface manager establishes a graphical user interface and also provides server support for communicating with a client TWAIN stub data source.

A TWAIN stub data source is a dynamic link library (DLL) which serves as a device driver for another TWAIN-compliant image processing application and which also establishes and maintains an inter-process communication link with the user interface manager. Each TWAIN stub data source has a descriptor indicative of a particular image input device but is otherwise identical to each other TWAIN stub data sources.

The operation manager communicates with the user interface manager and the image manager, and provides all of the functionality selected through the user interface. Accordingly, all input to the graphical user interface is passed to the operation manager. This arrangement isolates the user interface manager from other modules connected to the operation manager and, for example, allows the current user interface manager to be substituted with a user interface manager which provides a different graphical user interface.

When the application is run as a TWAIN-compliant interface to another image processing application, any functionality requested by the other application is provided by a TWAIN protocol manager. The TWAIN protocol manager is responsible for parsing TWAIN triplets, received from the TWAIN stub data source via the user interface manager and the operation manager, and for executing appropriate actions.

The image manager communicates with the operation manager and the driver manager. The image manager coordinates all image input, manipulation and resource allocation. For example, the operation manager may call the image manager to open an image stored in a computer file, read in the image, manipulate and update the image according to filter settings provided by the user interface manager, and store the updated image. As such, the image manager is interfaceable to various image manipulation and utility modules such as an image transformation module which may provide image sharpening and image rotation, a line transformation module which may provide image filter operations, a color matching module which may provide color selection techniques, as well as other imaging utilities.

Moreover, the image manager interfaces to an operating system (OS) utility module which provides the last layer of communication between the image processing application of the present invention and a current operating system. Therefore, the application can be ported to a selected operating system simply by replacing the OS utility module and the user interface manager.

Finally, the driver manager communicates with the image manager and various software device drivers. The driver manager is responsible for loading device drivers which correspond to the device selected in the user interface or selected by a TWAIN source manager of another image processing application. Because it handles all communications with device drivers, the driver manager allows multiple devices to be connected to the system and also allows for interchangeability of devices while maintaining a common interface to the image manager.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 6, comprising FIGS. 6A and 6B, is a flowchart for describing a TWAIN interface mode of an image processing application according to the present invention.

DETAILED DESCRIPTION OF THE DRAWINGS

The architecture described below pertains to an image processing application which provides an easily extensible interface to support various image input devices, image processing functions, graphical user interfaces, and operating systems. The application also provides an extensible TWAIN interface between various image input devices and other TWAIN-compliant image processing applications.

Figure 1:
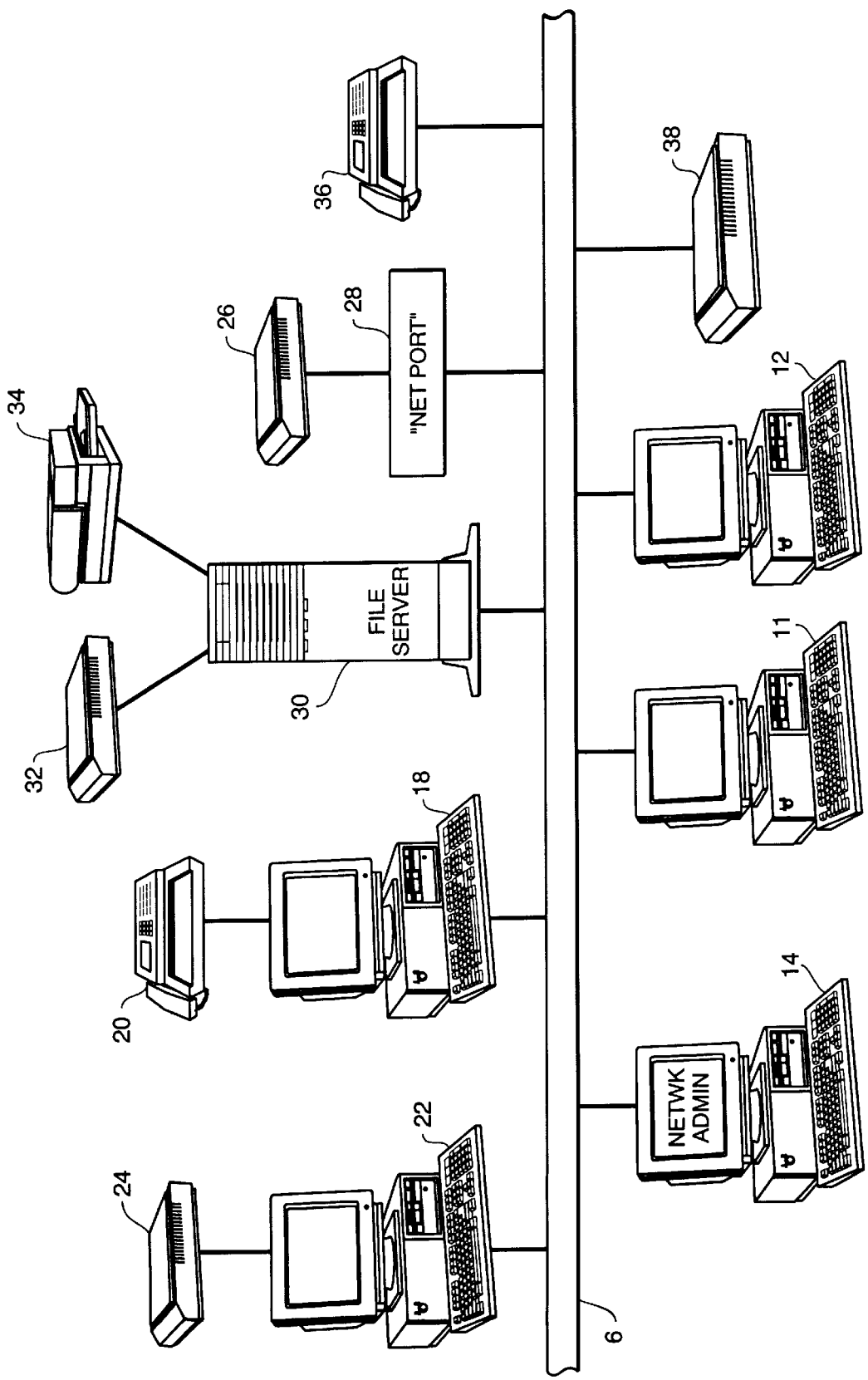
FIG. 1 is a view of a local area network.

As shown in FIG. 1, the invention may be embodied in a local area network which includes plural workstations and plural network peripherals. The image input devices may be a scanner, a facsimile machine, a file server, or the like. FIG. 1 shows one possible topography of a local area network (LAN) 6, including plural workstations, such as workstations 11 and 12, which are controlled by a network operating system, such as a Novell network operating system, and thereby communicate with other network devices connected to the LAN 6. One of the workstations, such as workstation 14, may be designated as a network administrator. One or more workstations may also have a facsimile machine connected to it, such as facsimile machine 20 connected to workstation 18. Furthermore, one or more of the workstations may have a scanner connected to it, such as scanner 24 connected to workstation 22. Additional scanners may be connected to the LAN 6 through a device such as "Net Port" 28, which is a general term for any self-contained network peripheral interface which provides device server functions. As shown in FIG. 1, "Net Port" 28 provides device server functions for scanner 26. Other peripheral devices, such as facsimile machine 36 and scanner 38, may be directly connected to the local area network. These devices provide their own server functionality through internal software and/or hardware. Also connected to the LAN 6 is a file server 30 which manages access to network files. The file server 30 may also be connected to other network peripherals, such as scanner 32 and printer 34.

In accordance with the arrangement of FIG. 1, the file server 30 provides device server functionality for its connected network peripherals. Similarly, workstation 22 provides scanning services to the LAN 6 from scanner 24 and workstation 18 provides facsimile services to the LAN 6 from facsimile machine 20. of course, many other permutations of network peripherals, workstations and network control systems may be used when practicing the present invention.

It should also be noted that the present invention may be embodied on a stand-alone computer or on a stand-alone computer connected to one or more external image input devices.

Figure 2:
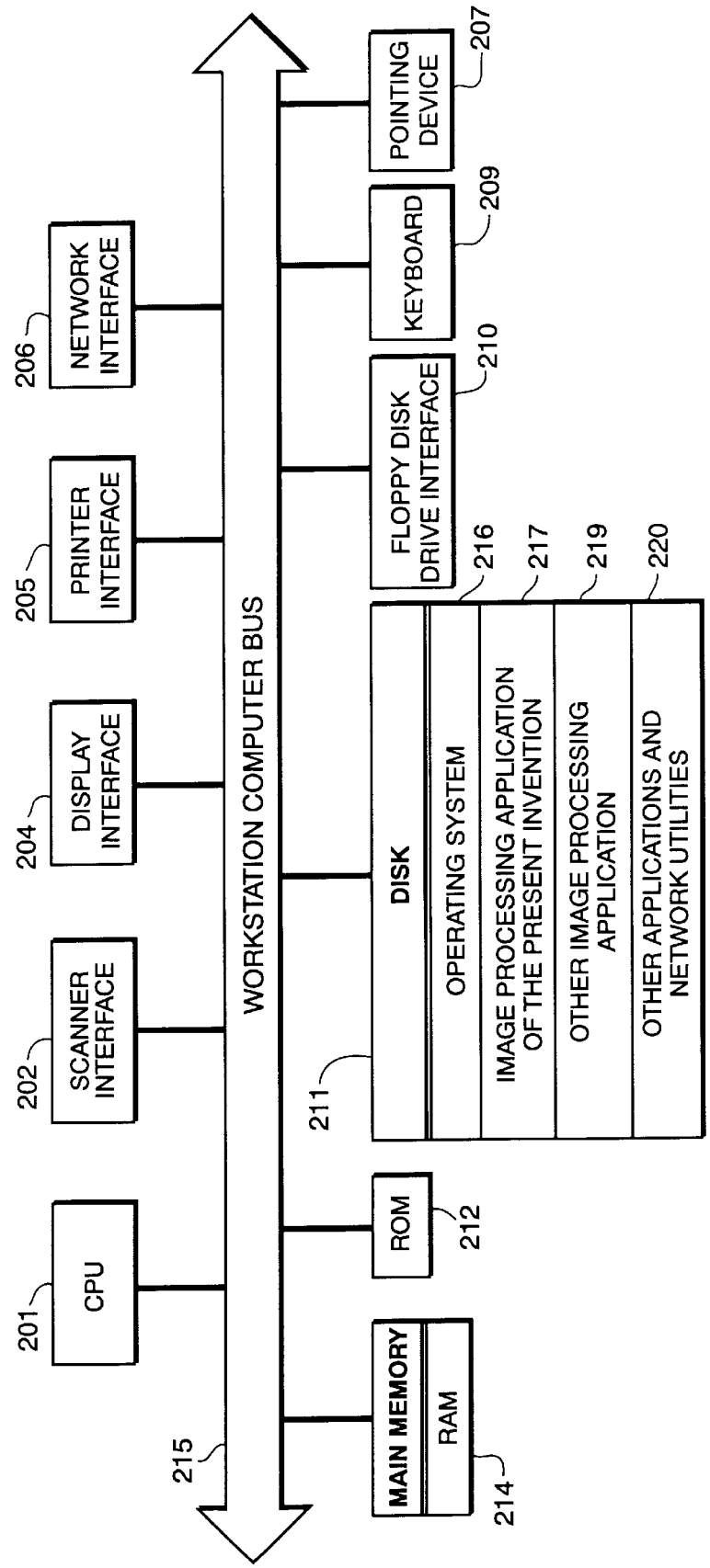
FIG. 2 is a block diagram of a general purpose computer employing the present invention.

FIG. 2 is a block diagram showing a generalized structure of a workstation employing the present invention, such as the workstations shown in FIG. 1. Of course, the structure is also generally descriptive of a stand-alone workstation embodying the present invention.

Shown in FIG. 2 is a central processing unit (CPU) 201 such as an Intel Pentium processor, a Motorola 68000 processor or the like, interfaced to a workstation computer bus 215. Also interfaced to workstation computer bus 215 is a scanner interface 202 for communicating with a scanning device, a display interface 204 for communicating with a display device, a printer interface 205 for communicating with a printing device, a network interface 206 for interfacing to the LAN, a floppy disk drive interface 210 from which data is retrieved and by which software is installed to the fixed disk drive 211, a keyboard 209, and a pointing device 207 such as a mouse or the like.

A main memory 214 has random access memory (RAM) interfaces to the computer bus 215 so as to provide the CPU 201 with access to memory storage locations. In particular, when executing stored application program instructions such as those stored on the fixed disk 211, the CPU 201 loads those instructions from the fixed disk 211 (or other storage media such as media accessed from the network via the network interface 206) into the main memory 214 and executes those stored program instructions from the main memory 214. The read only memory (ROM) 212 is provided for storing invariant instruction sequences such as basic input/output operating system (BIOS) instructions for operation of the keyboard 209, the floppy disk drive interface 210, and the like.

As shown in FIG. 2, the fixed disk drive 211 stores program instructions for an operating system 216, such as a windowing or DOS operating system. As described below, the architecture of the present invention is not dependent on the resident operating system 216. The fixed disk drive 211 also contains other applications and utilities 220 necessary for operation within a network. Also stored on the fixed disk drive 211 are an image processing application according to the present invention 217 and at least one other image processing application 219, such as Adobe Photoshop™ or Corel Draw™.

Figure 3:
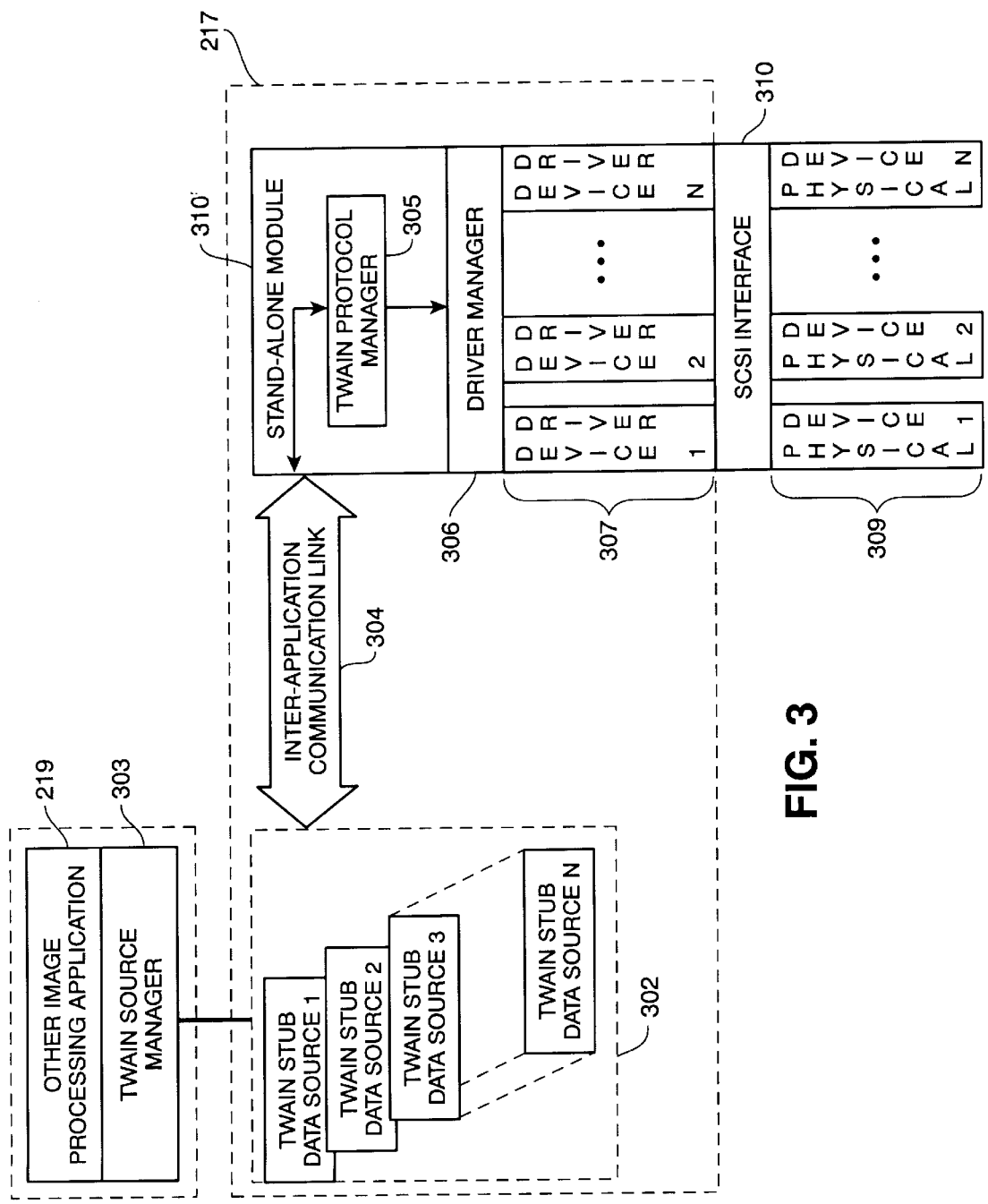
FIG. 3 is a view for describing the architecture of an image processing application according to the present invention.

FIG. 3 is a generalized block diagram for describing the TWAIN interface mode of an image processing application 217 according to the present invention. The application 217 contains plural TWAIN stub data sources 302, which are dynamic link libraries called by a TWAIN source manager 303 of another image processing application 219. Although it is indicated separately in FIG. 3, the TWAIN source manager 303 is an element of the other image processing application 219. Each TWAIN stub data source 302 corresponds to a supported image input device 309.

The TWAIN source manager 303 queries each TWAIN stub data source 302 in accordance with the TWAIN protocol to ascertain the types of available image input devices 309 and calls the TWAIN stub data source 302 corresponding to a selected image input device 309.

After being called by the TWAIN source manager 303, a TWAIN stub data source 302 establishes an inter-application communication link 304 with the stand-alone module 310 of the present image processing application 217. The other image processing application 219 then sends device commands to the called TWAIN stub data source 302, which sends the commands over the inter-application communication link 304 to the stand-alone module 310, and to a TWAIN protocol manager 305. The TWAIN protocol manager 305 parses the commands, which are in the form of TWAIN triplets, and executes appropriate actions.

Because the TWAIN source manager 303 queries the TWAIN stub data sources 302 to ascertain the types of available image input devices 309 and because the other image processing application 219 uses the TWAIN stub data sources 302 to determine the capabilities of their corresponding input image devices 309, the other image processing application 219 does not need to be updated each time support for an additional image input device 309 is desired. In order to support additional image input devices 309, the appropriate device drivers 307 and corresponding TWAIN stub data sources 302 must be added to the present image processing application 217. As described below, this operation is simple because each TWAIN stub data source 302 is identical except for a descriptor indicative of each data source's corresponding image input device 309.

Figure 4:
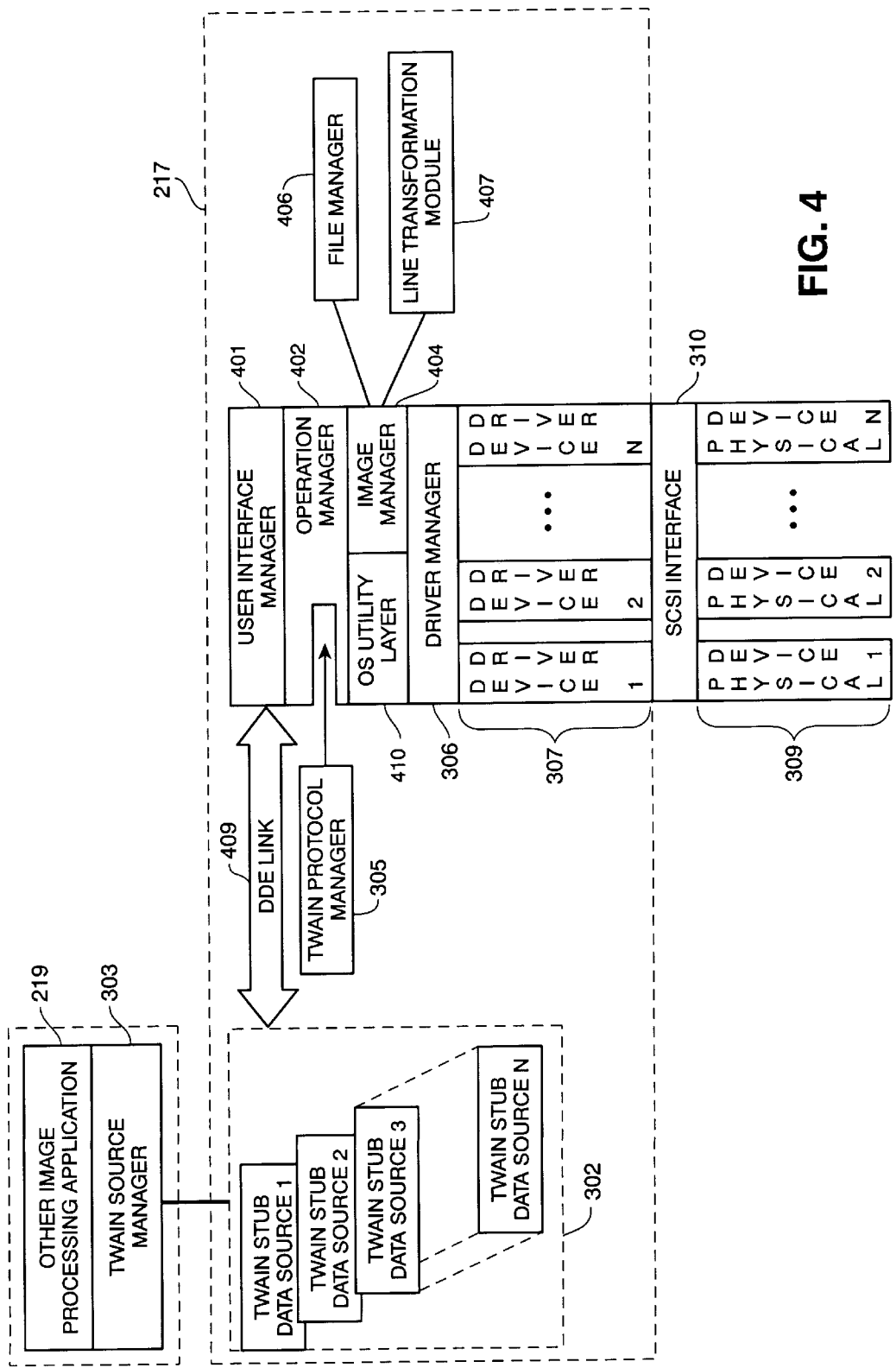
FIG. 4 is a detailed view for describing the architecture of an image processing application according to the present invention.
Figure 5:
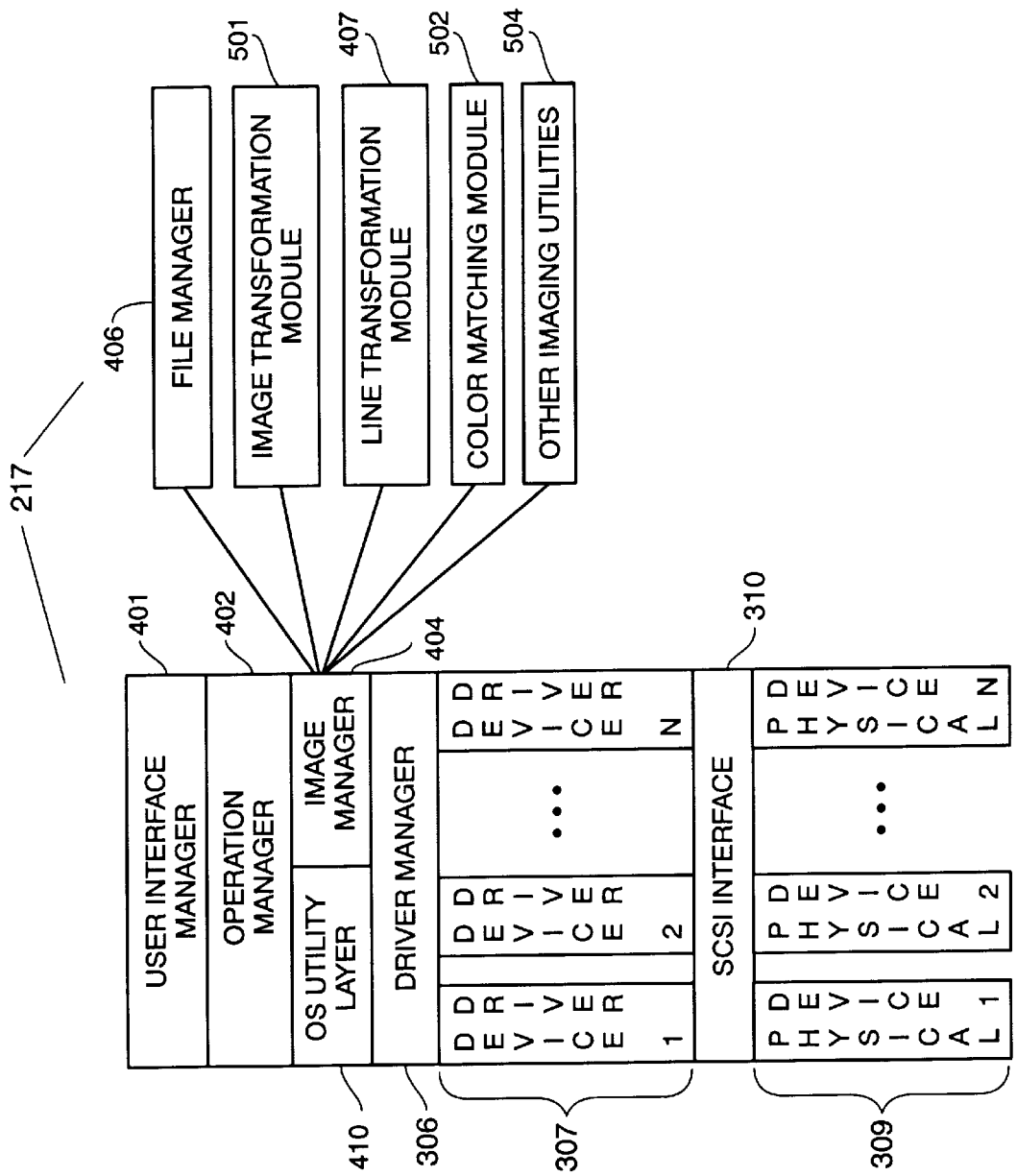
FIG. 5 is a view for describing a stand-alone mode of an image processing application according to the present invention.

FIG. 4 is a detailed view for describing the architecture of an image processing application 217 according to the present invention. Advantageously, this architecture allows the application 217 to operate in a stand-alone mode or as a TWAIN interface to another image processing application 219. However, when operating in a stand-alone mode, several modules of the architecture are not employed. These modules are omitted in FIG. 5. Therefore, the stand-alone mode will be described with reference to FIG. 5.

The user interface manager 401 presents a graphical user interface to a user and receives input from the user in accordance with the user's manipulation of the interface. The user interface manager 401 displays data through its graphical user interface in order to facilitate user control of image processing. For example, a user may select a "Preview" icon which is displayed within the graphical user interface. In response, the user interface manager 401 displays a low-resolution image of a document in real-time as the document is scanned. Furthermore, because the user interface manager 401 is solely responsible for displaying and controlling the graphical user interface, another graphical user interface can be employed simply by replacing the user interface manager 401 with another user interface manager 401 which is capable of displaying and controlling a different graphical user interface.

Operation manager 402 receives all of the commands input into the user interface manager 401 through the graphical user interface. Accordingly, the operation manager 402 translates these inputs, e.g., preview, zoom, scan, and copy, into actual operations. The operation manager 402 oversees these operations to ensure that the necessary process steps are performed in the correct order. For example, in a "scan-to-file" operation, the operation manager 402 communicates to a file manager 406 to open a file of a specified format and name, communicates to an image manager 404 to open an image for reading, reads image data from the image manager, and writes the image data to the file manager 406.

The image manager 404 controls image reading and processing. The image manager 404 coordinates opening an image input device 309, reading image data from the image input device 309, sending the image data to an image processing module such as a line transformation module 407 for line-by-line processing (half toning, color adjustment, etc.) and, if necessary, sending the data to another image processing module such as an image transformation module 501, a color matching module 502, or other imaging utilities 504. The processed image data is then sent to the manager that initiated the image read. Accordingly, when the application 217 is in stand-alone mode, the image manager 404 communicates with the driver manager 306 and the operation manager 402.

The line transformation module 407 includes any image filters which operate on individual blocks of image data. The line transformation module 407 is responsible for applying any selected filters to the input image data. Therefore, any image filter which operates on a block of image data is supported by interfacing a module which provides that filter to the line transformation module 407.

Conversely, the image transformation module 501 calls various modules to provide image transformations which operate on an entire image, such as image rotation.

The driver manager 306 is called by the image manager 404 to perform hardware-specific functions. The driver manager 306 is responsible for loading and communicating with a DLL device driver 307 which corresponds to an image input device 309 selected in the user interface. The main purpose of the driver manager 306 is to isolate any device-dependent function calls from the rest of the architecture. As a result, additional image input devices 309 are supported simply by adding an appropriate device driver 307.

The OS utility module 410 allows the image processing application 217 of the present invention to be ported to different operating system platforms, including Windows NT, MacIntosh, and OS/2. The OS utility module 410 abstracts a common set of operating system calls made by the image processing application 217 to the particular operating system in which the image processing application 217 is executing. The OS utility module 410 thereby provides a common systems-level API for all modules which must access operating system functions. Accordingly, the OS utility module 410 is accessible to any module in the architecture that requires operating system services.

By virtue of the foregoing, the architecture of the present invention is readily conformable to varying requirements. For example, the application can be ported to a new operating system platform by replacing the OS utility module 410 and by replacing the user interface manager 401 with one which provides a graphical user interface which is more consistent with the new operating system's native environment. In addition, new image processing features are supported simply by adding additional modules which may be accessed by the image manager 404. Furthermore, additional image input devices 309 are supported by adding appropriate device drivers 307.

Operation of the TWAIN interface mode is described below with reference to FIG. 4. In the TWAIN interface mode, the image processing application 217 of the present invention communicates to another image processing application 219 via an inter-process communication link 409. The link 409 is established by a TWAIN stub data source 302 after the TWAIN stub data source 302 is called by the TWAIN source manager 303, which is called by the other image processing application 219. The other application 219 calls the TWAIN source manager 303 as it would call any device driver. However, the TWAIN stub data source 302 does not perform "true" device driver functions. Rather, the TWAIN stub data source 302 simply establishes the link 409 and passes commands and receives data over the link 409. In this regard, the TWAIN stub data source 302 may be considered a "dummy" device driver.

Figure 6B:
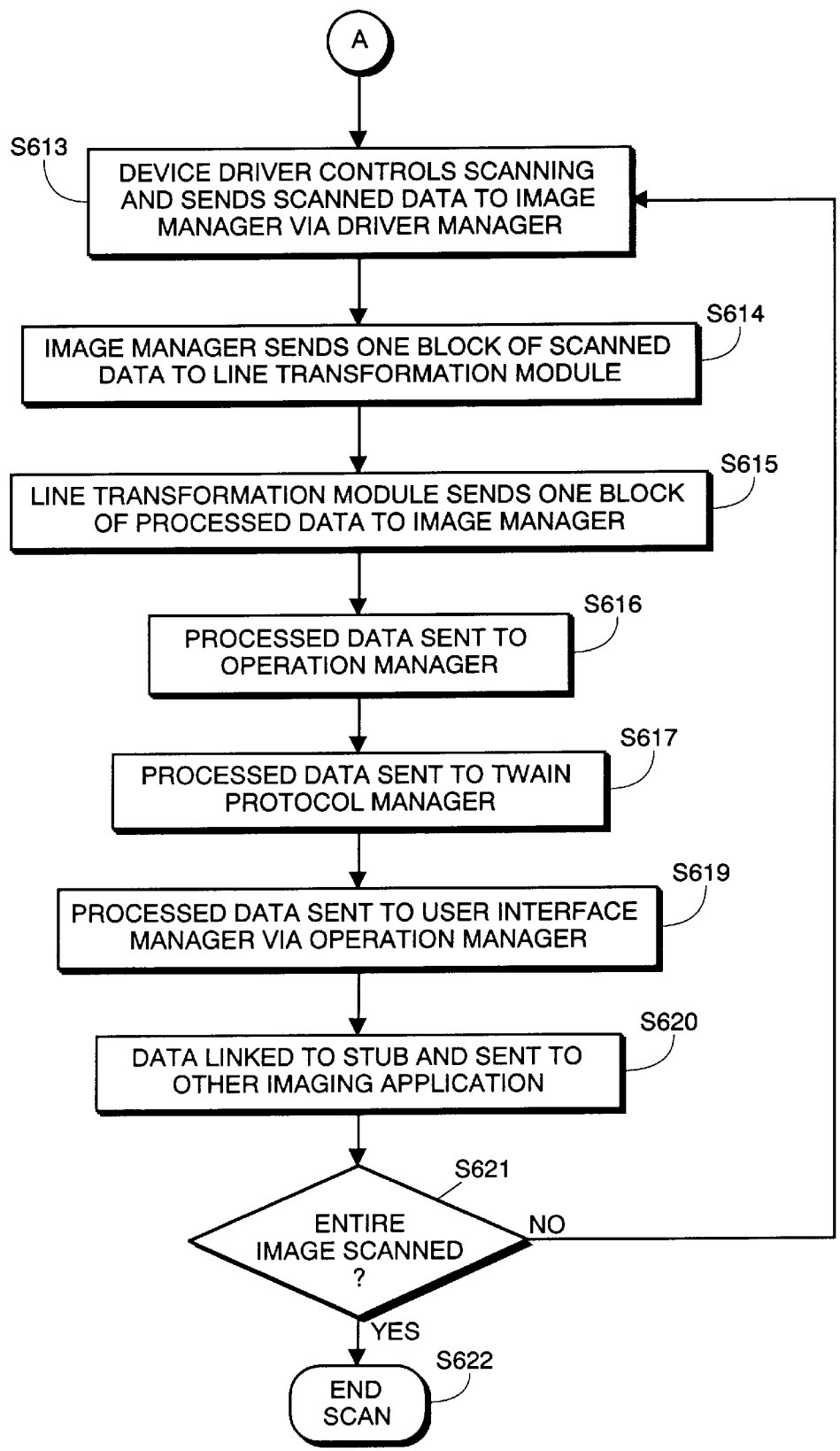

It should be understood that the image processing application 217 of the present invention provides stand-alone image processing functionality as well as a fully TWAIN-complaint interface to another image processing application 219. However, the operation of the present invention as a TWAIN interface will be described in reference to FIG. 6, which depicts the operation of the invention with respect to a TWAIN "scan" command.

Initially, in step S601, the other image processing application 219 is launched. Flow idles at step S602 while waiting for the other image processing application 219 to issue a "scan" command. A scan command is issued once the other application 219 seeks to receive TWAIN-compliant image data from a selected image input device 309. Subsequently, in step S604, the TWAIN source manager 303 of the other image processing application 219 searches for a device driver corresponding to the selected image input device 309 by querying the TWAIN stub data sources 302. When queried, the TWAIN stub data sources 302, which are DLL's and thereby provide their own functionality, each identifies a particular device type to the TWAIN source manager 303 by means of a descriptor residing in the same directory as the corresponding TWAIN stub data source 302. In step S606, TWAIN source manager 303 sends a "get identity" command to the TWAIN stub data source 302 which identifies the selected image input device 309. If the TWAIN source manager 303 cannot locate a TWAIN stub data source 302 containing a descriptor corresponding to the selected image input device 309, flow proceeds to step S605, in which a new image input device 309 is selected. Flow then returns to step S602.

Therefore, in order for the other image processing application 219 to access a certain image input device 309, the present invention must include a TWAIN stub data source 302 containing a descriptor which corresponds to that device 309. Accordingly, each TWAIN stub data source 302 corresponds to one supported image input device 309 and each supported image input device 309 corresponds to one TWAIN stub data source 302.

In step S607, the TWAIN stub data source 302 establishes a DDE link 409 with the user interface manager 401 of the present invention. However, any type of inter-process communication link can be used in practicing the invention, such as an Object Linking and Embedding (OLE) 1.0 or 2.0 link. According to standard DDE protocol, the DDE server application must be launched in order to establish a DDE link. In the present case, the server application is the image processing application 217 embodying the present invention. Therefore, in step S607, the TWAIN stub data source 302 launches the present image processing application 217, which causes the present image processing application 217 to display its main dialog window to the user. In addition, the TWAIN stub data source 302 embeds DDE data links in the user interface manager 401 of the present application 217.

In step S609, the TWAIN stub data source 302 sends its descriptor and the scan command received from the TWAIN source manager 303 in step S606 to the user interface manager 401 via the DDE link 409. The user interface manager 401 provides DDE server support to the other image processing application 219. All commands sent from the TWAIN stub data source 302 to the user interface manager 401 are represented by TWAIN triplets. However, the TWAIN triplets are processed exclusively by the TWAIN protocol manager 305, which parses the triplets and performs all of the operations necessary to carry out the received commands. Furthermore, the TWAIN protocol manager 305 can receive direct commands only from the operation manager 402. Therefore, the TWAIN triplets are passed from the user interface manager 401 to the operation manager 402 and, finally, to the TWAIN protocol manager 305.

Next, in step S610, in accordance with the TWAIN triplets, the TWAIN protocol manager 305 instructs the operation manager 402 to scan an image using the device driver 307 identified by the descriptor passed in step S609. In step S611, the operation manager 402, in turn, instructs the image manager 404 to scan an image.

The image manager 404 the instructs the driver manager 306 to load the identified device driver 307 in step S612. Therefore, the descriptors located in the TWAIN stub data sources 302 are used by both the TWAIN source manager 303 and the image manager 404 to identify the selected image input device 309.

As described above, although each TWAIN stub data source 302 contains a different descriptor, the functionality of each of the TWAIN stub data sources 302 is identical. Therefore, the program code of each TWAIN stub data source 302 is identical except for the data reflecting their particular descriptors. As a result, a new image input device 309 is supported simply by adding the appropriate device driver 307 and a new TWAIN stub data source 302, which is a duplicate of the existing TWAIN stub data sources 302 but which contains a descriptor indicative of the new image input device 309. Accordingly, the new TWAIN stub data source 302 alerts the other application 219 to the new input image device 309 when queried and, as described above in reference to FIG. 3, the other application 219 can inquire as to the hardware capabilities of the new image input device 309. Therefore, the other image processing application 219 does not need to be updated each time a new image input device 309 is added.

In step S613, the device driver loaded in step S611 controls image scanning by the selected image input device 309 and sends scanned data to the image manager 404 via the driver manager 306.

In step S614, the image manager 404 sends one block of scanned data to the line transformation module 407 for processing. Thereafter, in step S615, the line transformation module 407 sends one block of processed data to the image manager 404. In the preferred embodiment, the line transformation module 407 processes data when the image processing application 217 of the present invention is either in a stand-alone image processing mode or a TWAIN interface mode. Of course, other image processing modules may be used when operating the present application 217 in a TWAIN interface mode. However, since the other image processing application 219 will likely provide a good deal more image processing capabilities than the present application 217, only preliminary processing such as that provided by the line transformation module 407 is likely to be desired.

In step S616, the block of processed data is sent to the operation manager 402. Next, in step S617, because the operation manager 402 sends scanned and processed data to the manager that initiated the scan, the data is then sent to the TWAIN protocol manager 305.

Next, in step S619, the data is sent from the TWAIN protocol manager 305 to the user interface manager 401. Because the DDE links are embedded in the user interface manager 401, the data sent to the user interface manager 401 is sent to the other image processing application 219 in step S620.

In step S621, in the case that the entire image has not yet been processed, flow returns to step S613, wherein another block of image data is input to the image manager 404. If the entire image has been processed, flow proceeds to step S622, in which the scanning process ceases.

While the present invention has been described with respect to what is currently considered to be the preferred embodiment, it is to be understood that the invention is not limited to the disclosed embodiment. To the contrary, the invention is intended to cover various modifications and equivalent arrangements included in the spirit and scope of the appended claims.

What is claimed is:

1. A TWAIN-compliant image processing application, comprising:
   a plurality of TWAIN stub data sources, each having a descriptor indicative of a particular image input device but otherwise being identical, each of said TWAIN stub data sources being callable by another image processing application requiring device driver functionality;
   a TWAIN protocol manager which receives commands in the form of TWAIN triplets from one of the plurality of TWAIN stub data sources, parses the TWAIN triplets, and executes the commands; and
   a driver manager for communicating with the TWAIN protocol manager and a particular image input device indicated by a descriptor of the TWAIN stub data source from which the TWAIN protocol manager receives the TWAIN triplets.

2. A TWAIN-compliant image processing application according to claim 1,
   wherein each of said plurality of TWAIN stub data sources establishes an inter-application communication link with the TWAIN protocol manager.

3. A TWAIN-compliant image processing application according to claim 2,
   wherein the inter-application communication link is a Dynamic Data Exchange link.

4. A TWAIN-compliant image processing application according to claim 2, further comprising:
   a user interface manager for providing a graphical user interface by which a user can interface graphically with the image processing application, for providing inter-application communication link server support to one of the plurality of TWAIN stub data sources, and for receiving TWAIN triplets from one of the plurality of TWAIN stub data sources.

5. A TWAIN-compliant image processing application according to claim 4, further comprising:
   an operation manager for communicating with said user interface manager, said operation manager having passed to it input to the graphical user interface provided by the user interface manager, implementing functionality provided in the graphical user interface, and implementing functionality provided by the TWAIN protocol manager.

6. A TWAIN-compliant image processing application according to claim 5, further comprising:
   an operating system utility module by which the image processing application interfaces to a resident operating system, said operating system utility module receiving operating system-related calls and being accessible to any module requiring operating system services.

7. A TWAIN-compliant image processing application according to claim 6, further comprising:
   an image manager for communicating with said operation manager, for interfacing to image manipulation and utility modules so as to coordinate image input, manipulation and resource allocation, and for interfacing to said operating system utility module.

8. A TWAIN-compliant image processing application according to claim 7,
   wherein the user interface manager provides image previewing capabilities.

9. A TWAIN-compliant image processing application according to claim 7,
   wherein the image manager provides image processing capabilities to said other image processing application.

10. A TWAIN-compliant image processing application according to claim 1, further comprising:
    a user interface manager for providing a graphical user interface by which a user can interface graphically with the image processing application.

11. A TWAIN-compliant image processing application according to claim 10, further comprising:
    an operation manager for communicating with said user interface manager, said operation manager having passed to it input to the graphical user interface provided by said user interface manager, implementing functionality provided in the graphical user interface, and interfacing with said TWAIN protocol manager.

12. A TWAIN-compliant image processing application according to claim 11, further comprising:
    an operating system utility module by which the image processing application interfaces to a resident operating system, said operating utility module receiving operating system-related calls and being accessible to any module requiring operating system services.

13. A TWAIN-compliant image processing application according to claim 12, further comprising:
    an image manager for communicating with said operation manager, for interfacing to image manipulation and utility modules so as to coordinate image input, manipulation and resource allocation, and for interfacing to said operating system utility module.

14. A computer-readable medium storing computer-executable process steps, the process steps executable to provide:
    a plurality of TWAIN stub data sources, each having a descriptor indicative of a particular image input device but otherwise being identical, each of said TWAIN stub data sources being callable by another image processing application requiring device driver functionality;
    a TWAIN protocol manager which receives commands in the form of TWAIN triplets from one of the plurality of TWAIN stub data sources, parses the TWAIN triplets, and executes the commands; and a driver manager for communicating with the TWAIN protocol manager and a particular image input device indicated by a descriptor of the TWAIN stub data source from which the TWAIN protocol manager receives the TWAIN triplets.

15. A computer-readable medium storing computer-executable process steps according to claim 14,
wherein each of said plurality of TWAIN stub data sources establishes an inter-application communication link with the TWAIN protocol manager.

16. A computer-readable medium storing computer-executable process steps according to claim 15,
wherein the inter-application communication link is a Dynamic Data Exchange link.

17. A computer-readable medium storing computer-executable process steps according to claim 15, the process steps executable to provide:
a user interface manager for providing a graphical user interface by which a user can interface graphically with the image processing application, for providing inter-application communication link server support to one of the plurality of TWAIN stub data sources, and for receiving TWAIN triplets from one of the plurality of TWAIN stub data sources.

18. A computer-readable medium storing computer-executable process steps according to claim 17, the process steps executable to provide:
an operation manager for communicating with said user interface manager, said operation manager having passed to it input to the graphical user interface provided by the user interface manager, implementing functionality provided in the graphical user interface, receiving any TWAIN triplets received by the user interface manager, and passing the TWAIN triplets to the TWAIN protocol manager.

19. A computer-readable medium storing computer-executable process steps according to claim 18, the process steps executable to provide:
an operating system utility module by which the image processing application interfaces to a resident operating system, said operating system utility module receiving operating system-related calls and being accessible to any module requiring operating system services.

20. A computer-readable medium storing computer-executable process steps according to claim 19, the process steps executable to provide:
an image manager for communicating with said operation manager, for interfacing to image manipulation and utility modules so as to coordinate image input, manipulation and resource allocation, and for interfacing to said operating system utility module.

21. A computer-readable medium storing computer-executable process steps according to claim 20,
wherein the user interface manager provides image previewing capabilities.

22. A computer-readable medium storing computer-executable process steps according to claim 20,
wherein the image manager provides image processing capabilities to said other image processing application.

23. A computer-readable medium storing computer-executable process steps according to claim 14, the process steps executable to provide:
a user interface manager for providing a graphical user interface by which a user can interface graphically with the image processing application.

24. A computer-readable medium storing computer-executable process steps according to claim 23, the process steps executable to provide:
an operation manager for communicating with said user interface manager, said operation manager having passed to it input to the graphical user interface provided by said user interface manager, implementing functionality provided in the graphical user interface, and interfacing with said TWAIN protocol manager.

25. A computer-readable medium storing computer-executable process steps according to claim 24, the process steps executable to provide:
an operating system utility module by which the image processing application interfaces to a resident operating system, said operating utility module receiving operating system-related calls and being accessible to any module requiring operating system services.

26. A computer-readable medium storing computer-executable process steps according to claim 25, the process steps executable to provide:
an image manager for communicating with said operation manager and said TWAIN protocol manager, for interfacing to image manipulation and utility modules so as to coordinate image input, manipulation and resource allocation, and for interfacing to said operating system utility module.

27. An image processing application, comprising:
a plurality of stub data sources, each having a descriptor indicative of a particular image processing device but otherwise being identical, each of said stub data sources being callable by another image processing application requiring device driver functionality;
a protocol manager which receives commands from one of the plurality of stub data sources, parses the commands, and executes the commands; and
a driver manager for communicating with the protocol manager and a particular image processing device indicated by a descriptor of the stub data source from which the protocol manager receives the commands.

28. An image processing application according to claim 27,
wherein each of said plurality of stub data sources establishes an inter-application communication link with the protocol manager.

29. An image processing application according to claim 28,
wherein the inter-application communication link is a Dynamic Data Exchange link.

30. An image processing application according to claim 28, further comprising:
a user interface manager for providing a graphical user interface by which a user can interface graphically with the image processing application, for providing inter-application communication link server support to one of the plurality of stub data sources, and for receiving commands from one of the plurality of stub data sources.

31. An image processing application according to claim 30, further comprising:
an operation manager for communicating with said user interface manager, said operation manager having passed to it input to the graphical user interface provided by the user interface manager, implementing functionality provided in the graphical user interface, and implementing functionality provided by the protocol manager.

32. An image processing application according to claim 31, further comprising:
an operating system utility module by which the image processing application interfaces to a resident operating system, said operating system utility module receiving operating system-related calls and being accessible to any module requiring operating system services.

33. An image processing application according to claim 32, further comprising:

an image manager for communicating with said operation manager, for interfacing to image manipulation and utility modules so as to coordinate image input, manipulation and resource allocation, and for interfacing to said operating system utility module.

34. An image processing application according to claim 33, wherein the user interface manager provides image previewing capabilities.

35. An image processing application according to claim 33, wherein the image manager provides image processing capabilities to said other image processing application.

36. An image processing application according to claim 27, further comprising:

a user interface manager for providing a graphical user interface by which a user can interface graphically with the image processing application.

37. An image processing application according to claim 36, further comprising:

an operation manager for communicating with said user interface manager, said operation manager having passed to it input to the graphical user interface provided by said user interface manager, implementing functionality provided in the graphical user interface, and interfacing with said protocol manager.

38. An image processing application according to claim 37, further comprising:

an operating system utility module by which the image processing application interfaces to a resident operating system, said operating utility module receiving operating system-related calls and being accessible to any module requiring operating system services.

39. An image processing application according to claim 38, further comprising:

an image manager for communicating with said operation manager, for interfacing to image manipulation and utility modules so as to coordinate image input, manipulation and resource allocation, and for interfacing to said operating system utility module.

40. A computer-readable medium storing computer-executable process steps, the process steps executable to provide:

a plurality of stub data sources, each having a descriptor indicative of a particular image processing device but otherwise being identical, each of said stub data sources being callable by another image processing application requiring device driver functionality;

a protocol manager which receives commands from one of the plurality of stub data sources, parses the commands, and executes the commands; and a driver manager for communicating with the protocol manager and a particular image processing device indicated by a descriptor of the stub data source from which the protocol manager receives the commands.

* * * * *